United States Patent
VanDine

(10) Patent No.: US 8,318,369 B2
(45) Date of Patent: Nov. 27, 2012

(54) SYSTEM AND METHOD FOR REDUCING RADIATOR SIZES FOR LOW TEMPERATURE FUEL CELL SYSTEMS

(75) Inventor: Leslie L. VanDine, Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 0 days.

(21) Appl. No.: 13/462,058

(22) Filed: May 2, 2012

(65) Prior Publication Data
US 2012/0244450 A1 Sep. 27, 2012

Related U.S. Application Data

(62) Division of application No. 12/096,828, filed as application No. PCT/US2006/000859 on Jan. 10, 2006, now Pat. No. 8,192,883.

(51) Int. Cl.
H01M 8/04 (2006.01)

(52) U.S. Cl. ........ 429/437; 429/433; 429/434; 429/435; 429/436; 429/438

(58) Field of Classification Search ................. 429/433, 429/434, 435, 436, 437, 438, 442, 512; 165/104.13, 165/104.19, 104.21, 104.22, 108
See application file for complete search history.

(56) References Cited

U.S. PATENT DOCUMENTS

| | | |
|---|---|---|
| 4,743,517 A | 5/1988 | Cohen et al. |
| 5,537,956 A | 7/1996 | Rennfeld et al. |
| 6,120,923 A | 9/2000 | Van Dine et al. |
| 6,428,916 B1 | 8/2002 | Grasso et al. |
| 6,448,535 B1 | 9/2002 | Ap |
| 6,651,761 B1 | 11/2003 | Hrovat et al. |
| 2004/0001984 A1* | 1/2004 | Alva .................... 429/26 |
| 2005/0095477 A1 | 5/2005 | Perry et al. |

OTHER PUBLICATIONS

International Search Report for PCT Application No. PCT/US06/00859, Jun. 14, 2006.
International Preliminary Report on Patentability for PCT Application No. PCT/US06/00859, Jul. 24, 2008.

* cited by examiner

Primary Examiner — Jennifer Michener
Assistant Examiner — Heng Chan
(74) Attorney, Agent, or Firm — Carlson, Gaskey & Olds, P.C.

(57) ABSTRACT

A fuel cell cooling system includes a fuel cell having a liquid loop that produces water vapor. An antifreeze cooling loop includes an inductor that receives the water vapor and introduces the water vapor to an antifreeze. The water is separated from the antifreeze and returned to the liquid cooling loop as liquid water after the mixture of condensed water vapor and antifreeze has passed through a radiator. Water in the liquid cooling loop exits the fuel cell and passes through a restricting valve thereby lowering the pressure of the water. A flash cooler downstream from the restricting valve collects the water vapor and provides it to the inductor in the antifreeze cooling loop. The flash cooling in the first cooling loop provides a first cooling capacity that is low temperature and pressure compatible with fuel cell operation.

13 Claims, 1 Drawing Sheet

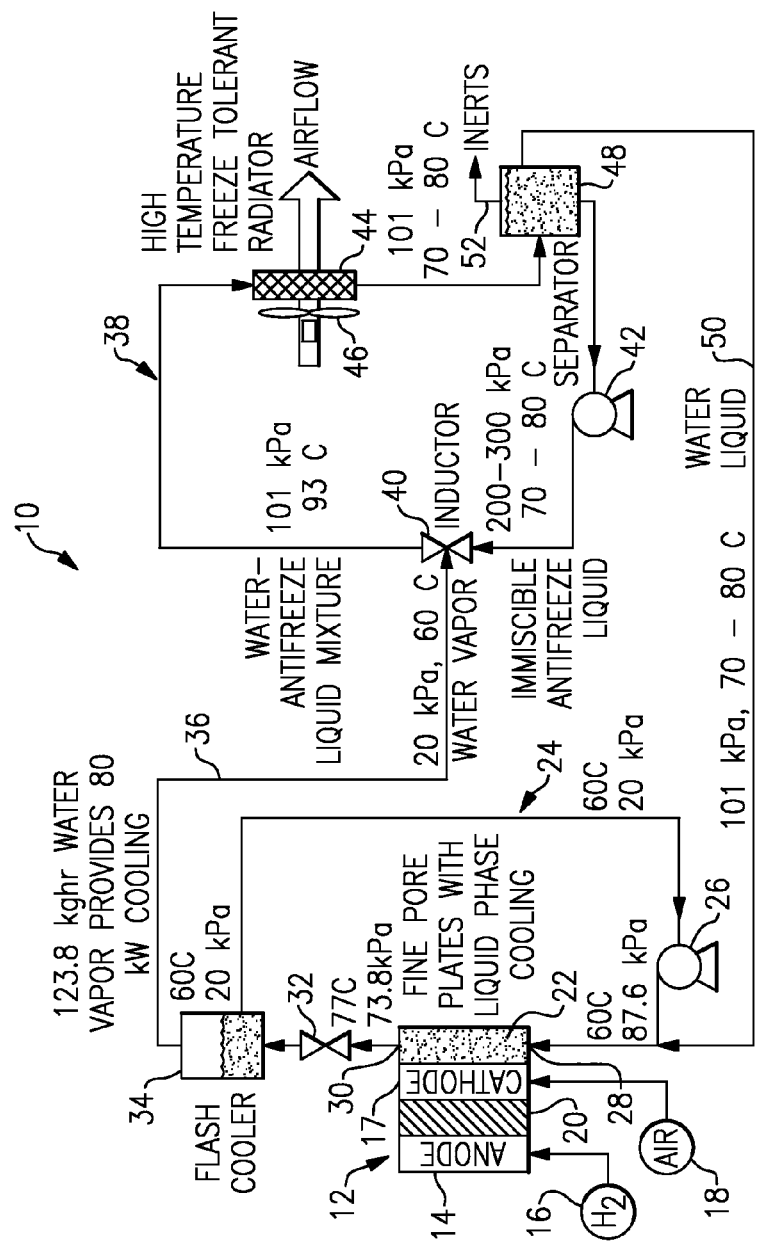
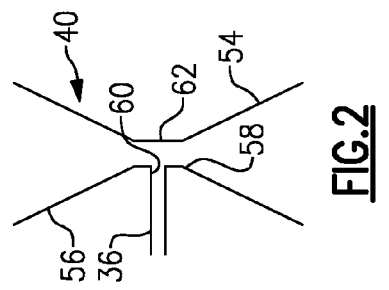

SYSTEM AND METHOD FOR REDUCING RADIATOR SIZES FOR LOW TEMPERATURE FUEL CELL SYSTEMS

This application is a divisional application of U.S. application Ser. No. 12/096,828, now U.S. Pat. No. 8,192,883, filed on Jun. 10, 2008, which was the National Stage of International Application No. PCT/US06/00859, filed on Jan. 10, 2006.

BACKGROUND OF THE INVENTION

This invention relates to a fuel cell cooling system using an antifreeze loop to supplement the cooling capacity of the liquid cooling loop.

Fuel cells are increasingly used for transportation applications. Fuel cells having proton exchange membranes (PEM) for these applications require large radiators to achieve a desired water balance within the fuel cell at high altitudes and/or high ambient temperatures. The fuel cell includes a stack having a cathode, anode and PEM electrolyte. The stack coolant inlet temperatures typically must be less than 60° C. to achieve the desired water balance. As a result, in one example, a radiator must be capable of rejecting between 70-80 kW of heat while providing a coolant return temperature to the fuel cell of less than 60° C.

The cell stack typically includes a liquid cooling loop, and an intermediate heat exchanger is used to separate the liquid coolant loop from an antifreeze that circulates through the radiator. The antifreeze is needed to prevent the radiator from freezing so that the fuel cell can operate in cold weather applications.

It is also desirable to operate the fuel cell near ambient pressure. Therefore, what is needed is a cooling system operating at near ambient pressure and at a temperature of 60° C. or lower in the fuel cell while rejecting heat from the antifreeze/water loop at higher temperatures to minimize radiator size.

SUMMARY OF THE INVENTION

The present invention provides a fuel cell cooling system including a fuel cell having a liquid water loop that produces low pressure water vapor. An antifreeze cooling loop includes an inductor that receives the water vapor, pressurizes the water vapor and introduces the water vapor to an antifreeze. The water is separated from the antifreeze and returned to the fuel cell cooling loop as liquid water after the mixture of condensed water vapor and antifreeze has passed through a radiator. Preferably, the antifreeze is an immiscible antifreeze so that the water can be easily separated from the antifreeze.

Water in the liquid cooling loop exits the fuel cell and passes through a restricting valve thereby lowering the pressure of the water. A flash cooler downstream from the restricting valve collects the water vapor and provides it to the inductor in the antifreeze cooling loop. The flash cooling in the first cooling loop removes fuel cell waste heat as vaporized water which passes on to the antifreeze cooling loop. The antifreeze cooling loop is higher pressure and condenses the water vapor at higher temperatures. Higher radiator temperatures minimize radiator size.

Accordingly, the present invention provides a high temperature cooling system combined with near ambient pressure and low temperature cooling in the fuel cell without increasing the size of the radiator in the antifreeze cooling loop.

BRIEF DESCRIPTION OF THE DRAWINGS

The disclosure can be further understood by reference to the following detailed description when considered in connection with the accompanying drawings wherein:

FIG. 1 is a schematic of one example fuel cell cooling system according to the present invention.

FIG. 2 is a schematic of an inductor shown in FIG. 2.

DETAILED DESCRIPTION OF THE PREFERRED EMBODIMENT

A schematic of a fuel cell system 10 is shown in FIG. 1. It should be understood, however, that the fuel cell system 10 is only exemplary. That is, additional, fewer and/or different components may be used and/or the components rearranged and still fall within the scope of this invention.

The fuel cell system 10 includes a fuel cell 12 having an anode 14 receiving fuel 16 such as hydrogen. The fuel cell 12 also includes a cathode 17 receiving an oxidant 18 such as air. A PEM 20 is arranged between the anode 14 and cathode 17.

A cooler 22 receives liquid water that is produced within the fuel cell 12. The liquid water within the cooler 22 is circulated throughout a first cooling loop 24 by a pump 26. The fuel cell 12 includes an inlet 28 and an outlet 30. It is desirable for the liquid water entering the inlet 28 to be at approximately 60° C. It should be understood, however, that the pressures and temperatures associated with the various components in FIG. 1 are exemplary only.

The liquid water exiting the fuel cell 12 flows through a restrictor such as a restricting valve 32 to lower the pressure of the liquid water. An orifice may also be used as a restrictor, for example. The liquid water exiting the restricting valve 32 enters a flash cooler 34 that collects water vapor since the boiling point of the water has been significantly lowered by the reduced pressure. A water vapor line 36 fluidly connects the flash cooler 34 to a second cooling loop 38. Vaporization of the liquid water by the restriction water 32 and flash cooler 34 provides a first cooling capacity.

The second cooling loop 38 includes a fluid connector such as an inductor 40 that receives the water vapor. The inductor 40 increases the pressure of the water vapor so that the water vapor condenses. An example inductor 40 is shown in FIG. 2. A compressor may also be used as an inductor. The second cooling loop 38 includes an antifreeze, preferably an antifreeze that is immiscible.

Referring to FIG. 2, the inductor 40 includes a nozzle 54 having an exit 58. The water vapor is provided by an orifice 60 of the water vapor line 36 near the exit 58. A diffuser 56 may be arranged near the exit 58 downstream from the nozzle 54. A throat 62 may be provided between the nozzle 54 and diffuser 56 with the orifice 60 arranged at the throat. It should be understood that the structure described and shown in FIG. 2 is only exemplary.

The inductor 40 produces a mixture of the immiscible antifreeze and condensed water vapor. The mixture is circulated by a pump 42. A radiator 44 receives the mixture, and a fan 46 blows air through the radiator 44 to cool the mixture. A separator 48 receives the mixture and separates the immiscible antifreeze and liquid water. Any inert gases are released by an exit 52 in the separator 48. A liquid water return line 50 fluidly connects the separator 48 and first cooling loop 24 so that the liquid water that was originally introduced to the second cooling loop as water vapor is returned to the first cooling loop 24.

In prior art systems, the radiator needed to provide the entire desired cooling capacity for the fuel cell 12 at relatively low fuel cell operating temperatures. This requires a relatively large radiator. In the inventive fuel cell system 10, the vaporization of the water in the first cooling loop 24 reduces the cooling capacity needed from the radiator 44. The pressurization of cooling water vapor from the fuel cell cooling loop permits the use of a higher radiator temperature in the antifreeze cooling loop. This results in a smaller radiator than the prior art systems.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of cooling a fuel cell comprising:
   a) evaporating a first coolant from the fuel cell in a first cooling loop to produce a first coolant vapor and provide a first cooling capacity; and
   b) mixing the first coolant vapor with a second coolant in a second cooling loop to produce a mixture and provide a second cooling capacity,
   wherein the second cooling loop includes an inductor including a nozzle and an exit joined at a throat, and an orifice arranged near the exit;
   a water vapor line fluidly connects the first coolant loop and the orifice and configured to introduce the first coolant vapor to the throat; and
   the mixing step includes the nozzle receiving the second coolant at the nozzle to provide the mixture of the first coolant vapor and the second coolant at the exit.

2. The method of claim 1, wherein step a) includes reducing a pressure of the first coolant.

3. The method of claim 1, wherein step b) includes condensing the first coolant vapor into liquid first coolant in the second cooling loop.

4. The method of claim 3, comprising step c) separating the liquid first coolant from the second coolant.

5. The method according to claim 4, comprising step d) returning the liquid first coolant to the first cooling loop.

6. The method according to claim 1, wherein step a) produces a first temperature associated with the first cooling capacity, and step b) produces a second temperature associated with the second cooling capacity, the second temperature higher than the first temperature.

7. The method of claim 1, wherein the second cooling loop is separating the first coolant from the second coolant and returning the first coolant to the first cooling loop as liquid first coolant.

8. The method of claim 7, wherein the second coolant is selected from the group consisting of an antifreeze, an immiscible fluid and a combination thereof.

9. The method of claim 8, wherein the first coolant is water, and the second coolant is an immiscible fluid.

10. The method of claim 7, wherein the first cooling loop includes a restrictor receiving the first coolant from the fuel cell and lowering a pressure of the first coolant to produce the first coolant vapor, and a flash cooler collecting the first coolant vapor from the first coolant exiting the restrictor while dropping the temperature of the first coolant.

11. The method of claim 10, wherein the water vapor line fluidly connects the first coolant vapor to the inductor in the second cooling loop, the inductor raising the pressure of the first coolant vapor and condensing the first coolant vapor.

12. The method of claim 7, wherein the inductor condenses the first coolant vapor to the liquid first coolant, a pump circulates the first and second coolants to a heat exchanger for cooling, and a return line fluidly connects the first and second cooling loops and provides the cooled first coolant to the first cooling loop.

13. The method according to claim 7, wherein inductor includes a diffuser arranged near the exit downstream from the nozzle, and the orifice is arranged at the throat.

* * * * *